United States Patent
Sink

(10) Patent No.: US 7,661,692 B1
(45) Date of Patent: Feb. 16, 2010

(54) VEHICLE DOLLY AND METHOD

(76) Inventor: Dwight L. Sink, 170 Avalon Dr., Lexington, NC (US) 27295

( * ) Notice: Subject to any disclaimer, the term of this patent is extended or adjusted under 35 U.S.C. 154(b) by 375 days.

(21) Appl. No.: 11/507,401

(22) Filed: Aug. 21, 2006

(51) Int. Cl.
B62D 53/04 (2006.01)

(52) U.S. Cl. ..................................... 280/402
(58) Field of Classification Search .................. 280/402
See application file for complete search history.

(56) References Cited

U.S. PATENT DOCUMENTS

| | | | | |
|---|---|---|---|---|
| 2,639,926 A | * | 5/1953 | Parks ....................... | 280/47.15 |
| 2,943,863 A | * | 7/1960 | Corey et al. .............. | 280/79.11 |
| 4,081,090 A | * | 3/1978 | Hopkins ..................... | 414/373 |
| 4,712,967 A | * | 12/1987 | Farthing .................... | 414/563 |
| 5,215,425 A | * | 6/1993 | Hambright .................. | 414/481 |
| 5,326,215 A | * | 7/1994 | Eberhardt ................... | 414/563 |
| 6,164,897 A | * | 12/2000 | Edwards ..................... | 414/537 |
| 6,663,131 B2 | * | 12/2003 | Evans ....................... | 280/476.1 |
| 6,679,511 B2 | * | 1/2004 | Parker et al. ............. | 280/415.1 |
| 7,017,934 B2 | * | 3/2006 | Harris ....................... | 280/476.1 |

* cited by examiner

Primary Examiner—Paul N Dickson
Assistant Examiner—Michael R Stabley

(57) ABSTRACT

A dolly and method of use allow a disabled tractor to be efficiently and safely towed to a distant location. The dolly includes a ramp whereby the tractor can be easily rolled onto the dolly and secured thereto by tie-down chains. The method of use includes the steps of towing the dolly by wrecker to the disabled tractor, disengaging the dolly from the wrecker and connecting the wrecker to the tractor. The tractor is then urged by the wrecker up the ramp of the dolly where it is then secured. Electrical and pneumatic lines are connected from the wrecker to the dolly to operate brake lights, warning lights and the brake system of the dolly as conventional with trailers so the tractor can be safely towed to a distant location.

3 Claims, 3 Drawing Sheets

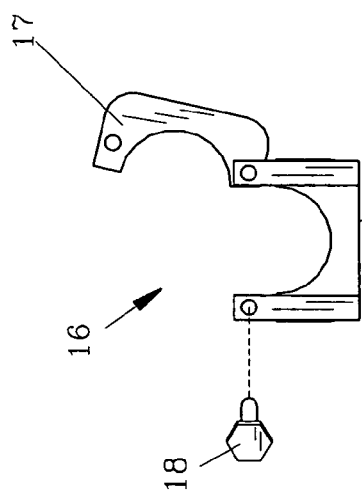
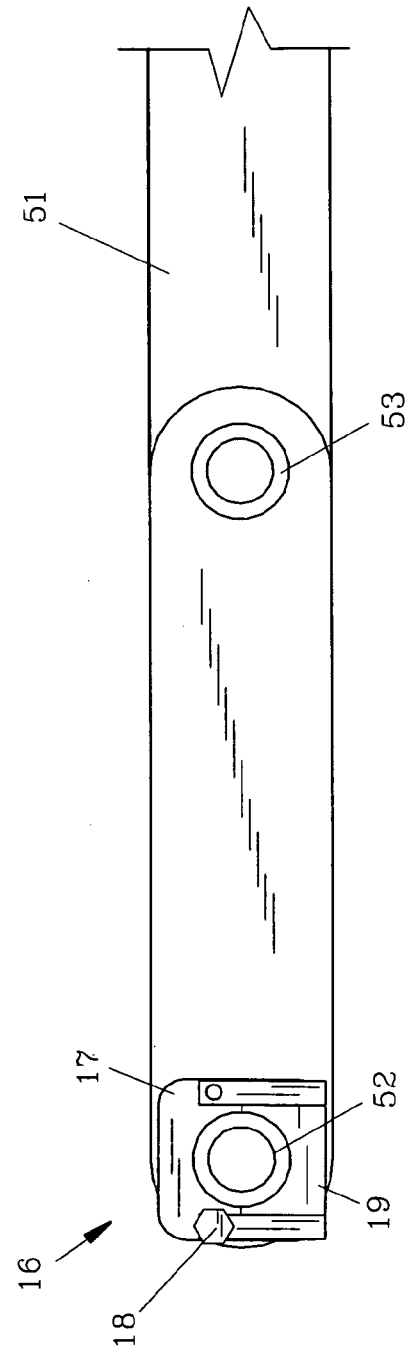
FIG. 4
FIG. 5

VEHICLE DOLLY AND METHOD

FIELD OF THE INVENTION

The invention herein pertains to a dolly for towing disabled vehicles and particularly pertains to towing trailer tractors using a dolly.

DESCRIPTION OF THE PRIOR ART AND OBJECTIVES OF THE INVENTION

Tractor-trailers transport most of the goods in the United States and in other countries. The trailer is usually attached to the tractor with a standard "fifth wheel" which provides ease and security in the connection. Tractors come in various sizes and types and most modern tractors employ a wind-guard to reduce air resistance for fuel economy as they travel. Wreckers and other towing vehicles are often employed to move disabled tractors from one location to a garage or repair yard distanced from the point of disablement. Tractors utilize a drive shaft for the rear wheels which must be removed before towing if the rear wheels remain on the ground. In the past, tractors were often towed in a "backward" posture as opposed to the wrecker whereby the rear wheels were lifted from the ground by the wrecker and the front wheels rolled along the highway during the towing process. With modern tractors having wind-guards, the backwards towing is rarely implemented since the wind-guard causes a severe drag on the wrecker's momentum. If the tractor is towed "forward" with the front wheels lifted and the rear wheels on the road, then the tractor drive shaft must be removed before towing to prevent transmission damage. However, the tractor's owner and garage then require or request the wrecker driver to re-install the drive shaft upon arrival at the garage or other destination, a task most wrecker drivers are usually not qualified or capable of completing. If the drive shaft is left removed the tractor owner is unhappy as he usually must hire a mechanic to properly reconnect the drive shaft at an additional expense.

In order to remedy this problem wreckers in the past have used dollies which lift both the front and rear wheels of the disabled tractor. However certain prior dollies do not have needed safety features for long distance towing. Thus, in order to provide a dolly for safely and economically towing a tractor, the present invention was conceived and one of its objectives is to provide a dolly having a bed which maintains the tractor in a forward posture with both the front and rear wheels of the tractor thereon.

It is another objective of the present invention to provide a dolly having a light array at the terminal end of the dolly at a height to sufficiently warn following motorists during adverse weather or in dim light conditions.

It is still another objective of the present invention to provide a dolly having an air tank which will supply air to the wheel brakes of the dolly should the pneumatic lines from the wrecker or towing vehicle to the dolly inadvertently become disconnected.

It is still a further objective of the present invention to provide a dolly with a stop to allow the disabled tractor to be correctly and securely mounted thereon.

It is yet another objective of the present invention to provide a ramp attached to the dolly frame for ease in loading without the need of an air bag or jack to lift the disabled vehicle.

It is still a further objective of the present invention to provide a dolly and method for towing trailer tractors, yet which can be used for other vehicles as needed.

Various other objectives and advantages of the present invention will become apparent to those skilled in the art as a more detailed description is set forth below.

SUMMARY OF THE INVENTION

The aforesaid and other objectives are realized by providing a dolly formed from tubular steel by conventional welding techniques. At the proximal end of the dolly a ramp is provided for ease and convenience in loading tractors or other vehicles. Left and right rear wheel pairs are provided at the distal end of the dolly and mounted thereabove is an air tank for supplying emergency air to the wheel brakes in the event the pneumatic connections from the wrecker to the dolly are inadvertently ruptured. An array of lights is positioned on and elevated from the distal end of the dolly frame to warn following motorists during adverse weather or in poor light conditions. Planar beds are attached to the dolly frame on each side to support the rear tractor wheels. Between the ramp and beds on each side are tie-down bars for affixing chains or other tie-down components. Stops at the terminal end of each bed prevent excessive rearward movement of the tractor as it is positioned on the dolly. A pair of clamps at the proximal end of the dolly allow a secure connection between the dolly and the hydraulic arm of the wrecker when the unloaded dolly is towed. Electrical and pneumatic lines from the wrecker to the dolly are provided for the brake lights, warning lights and the brake system of the dolly as conventional.

The method of using the dolly includes the steps of first connecting the wrecker to the dolly with the usual hydraulic wrecker arm. The arm is extended to the proximal end of the dolly to allows the U-shaped dolly clamps to engage the standard wheel supports on the hydraulic arm. The clamps are then pinned closed. An electrical line for the dolly brake lights and warning lights is attached to the dolly from the wrecker along with the pneumatic lines to operate the dolly brakes. The dolly is then ready for transportation to a disabled tractor or other vehicle. Upon arrival at the disabled tractor the electrical and pneumatic lines are disconnected from the wrecker and the hydraulic wrecker arm is disconnected from the U-shaped clamps on the dolly. The wrecker is then positioned in front of the disabled tractor and the wrecker arm engages the front wheels or front axle of the tractor as conventional. The tractor is then urged rearwardly by the wrecker up the dolly ramp so the rear sets of tractor wheels are on the dolly beds, proximate the dolly stops. The tractor is then manually tied to the dolly frame by chains having J-shaped hooks at the terminal ends at each side and at the rear of the dolly. The electrical and pneumatic lines are reconnected from the dolly to the wrecker and checked for operability. The hydraulic arm of the wrecker is then lifted to raise the tractor and dolly attached thereto. Once all tie-downs and connections are determined sufficient the dolly and tractor are then towed to the garage or other selected site. Upon arrival at the destination the wrecker arm lowers the tractor and dolly whereby the dolly ramp is on the ground, pneumatic and electrical lines are disconnected from the wrecker and thereafter the tractor is untied from the dolly. The tractor is then pulled by the wrecker from the dolly and disconnected from the hydraulic arm of the wrecker for repair or other purposes.

BRIEF DESCRIPTION OF THE DRAWINGS

FIG. 4 pictures an enlarged elongated clamp removed from the dolly in an open position; and FIG. 5 depicts the clamp in FIG. 4 but in a closed posture connected to the hydraulic arm of the wrecker.

DETAILED DESCRIPTION OF THE PREFERRED EMBODIMENT AND OPERATION OF THE INVENTION

Figure 1:
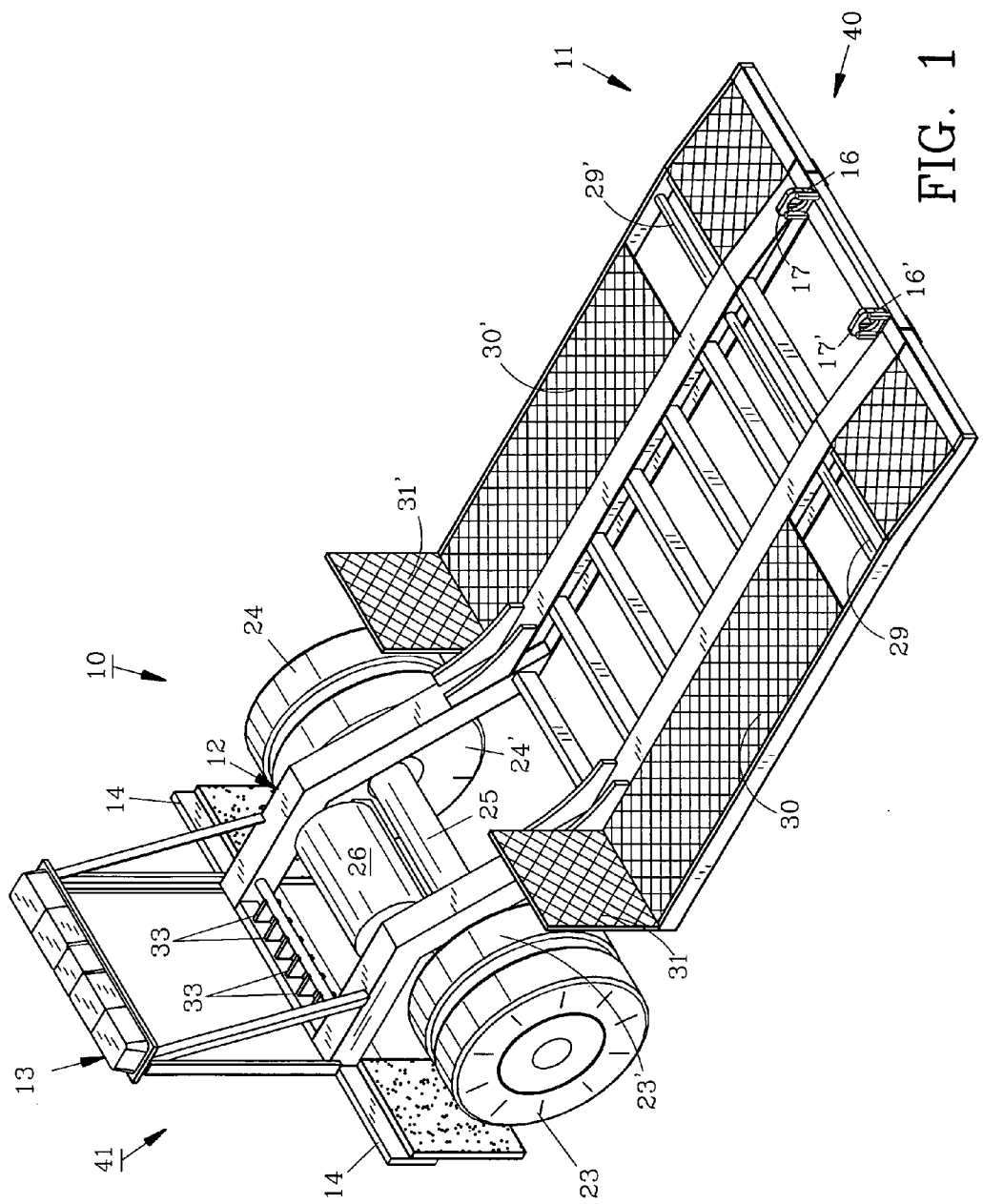
FIG. 1 shows a perspective view of the dolly without a tractor or vehicle thereon.
Figure 2:
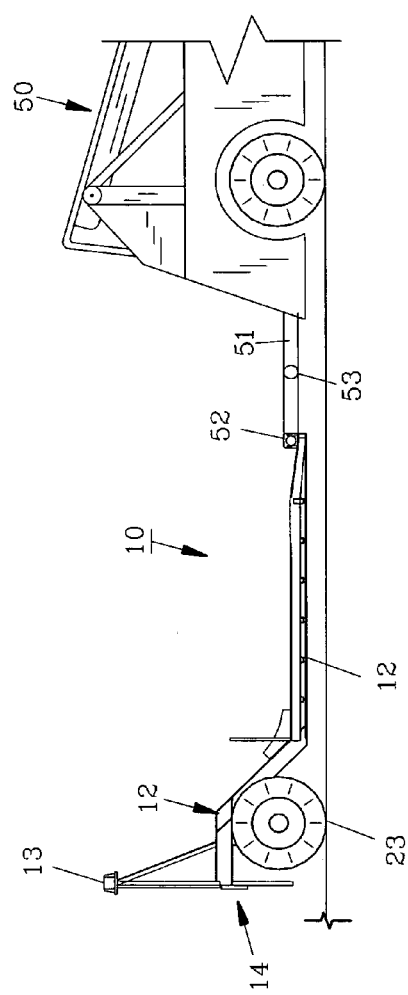
FIG. 2 demonstrates a schematic side elevational view of the dolly attached to a conventional wrecker.
Figure 3:
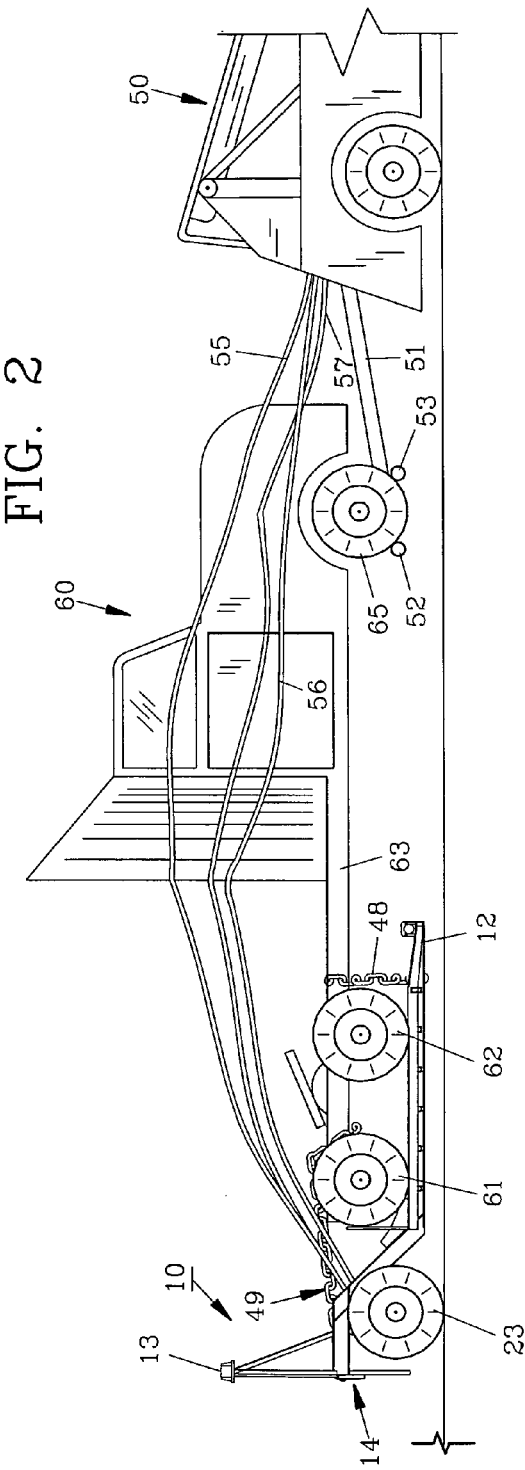
FIG. 3 illustrates the side elevational view of the dolly with a disabled tractor loaded thereon and connected to a wrecker for towing.

For a better understanding of the invention and its operation, turning now to the drawings, FIG. 1 shows a perspective view of preferred dolly 10 of the invention without a tractor or other vehicle thereon. Dolly 10 includes frame 12 formed from tubular steel or other suitable materials and extends from proximal end 40 to distal end 41. Frame 12 includes ramp 11 at proximal end 40 and warning array lights 13 and brake lights 14 at distal end 41, also shown in FIGS. 2 and 3. Warning array lights 13 are positioned in an elevated fashion above frame 12 to provide a warning to following motorists such as in adverse weather or poor lighting conditions. Frame 12 also provides U-shaped clamps 16, 16' positioned at proximal end 40 attached as by welding or the like. As shown enlarged in FIGS. 4 and 5, clamps 16, 16' include top 17, shown open in FIG. 4 and closed in FIG. 5, with base 19. Pin 18 passes through apertures in base 19 and top 17 for securing clamp 16 around wheel support 52 of hydraulic arm 51 as shown in FIGS. 2 and 5 during towing by for example, wrecker 50 seen in FIG. 2. Dolly 10 employs two pairs of wheels 23, 23', 24, 24' which are attached to axle 25. Standard air brakes on wheels 23, 23', 24, 24' are not shown but are operated from pneumatic tank 26 during emergency circumstances such as by an inadvertent disconnection or rupture of pneumatic lines 55, 56 shown in FIG. 3. Pneumatic lines 55, 56 operate the brake system of dolly wheels 23, 23', 24, 24' as conventional for typical pneumatic trailer brakes. Electrical line 57 from wrecker 50 to dolly 10 is also seen in FIG. 3 is likewise conventional to operate dolly brake lights 14 and warning lights 13.

As further seen in FIG. 1, wheel beds 30, 30' attached to frame 12 are planar and formed from one quarter inch (0.65 cm) steel plate or other suitable materials. Beds 30, 30' support rear tractor wheels 61, 62 of tractor 60 as seen in FIG. 3. At the distal ends of beds 30, 30' mounted to frame 12 are upright stops 31, 31' seen in FIG. 1. Stops 31, 31' terminate the rear movement of tractor 60 during loading.

Tractor 60 is tied to dolly 10 by the use of preferably high tensile grade ⅝ inch tie-down chains 48, 49 which include conventional J-hooks (not seen) at the ends thereof. Chain 48 is connected at one end to tie-down bar 29 (FIG. 1) and after passing across tractor frame 63 (FIG. 3) is connected to tie-down bar 29', also shown in FIG. 1. Similarly, chain 49 is manually affixed to tie-down supports 33 (FIG. 1) on distal end 41 of frame 12 and are positioned in an "X" configuration around tractor frame 63 for securely maintaining tractor 60 to dolly 10.

As shown herein, wrecker 50 is a conventional heavy duty wrecker with hydraulic arm 51 having wheel supports 52, 53 thereon, however other standard towing vehicles could likewise be used with dolly 10.

The preferred method of using dolly 10 includes the steps of connecting a wrecker such as conventional wrecker 50 in FIG. 2 to dolly 10 by clamps 16, 16'. Pins 18, 18' (18' not shown) are removed, tops 17, 17' (see FIG. 4) rotated clockwise and clamps 16, 16' are opened to receive wheel support 52 of wrecker arm 51 within bases 19, 19' (19' not shown). Tops 17, 17' are then rotated counterclockwise to close clamps 16, 16' as shown in FIG. 5 and pins 18, 18' inserted for securing clamps 16, 16' in a closed posture. The electrical line and pneumatic lines are connected from the dolly to the wrecker for operation of the dolly brake and warning lights and brake system. As seen in FIG. 2, dolly 10 can then be towed by wrecker 50 to a disabled tractor or other vehicle as needed. Once wrecker 50 arrives at the disabled tractor such as standard tractor 60 shown in FIG. 3, hydraulic arm 51 of wrecker 50 is disengaged from clamps 16, 16'. The pneumatic and electrical lines respectively 55, 56 and 57 are disconnected from wrecker 50 and wrecker 50 is then positioned in front of disabled tractor 60 and attached thereto as is conventional by adjustment of hydraulic arm 51 and wheel supports 52, 53 with conventional wheel tie-straps (not shown) employed. Once connected, wrecker 50 is then able to move and manipulate tractor 60 along ramp 11 and onto beds 30, 30' of dolly 10 (FIG. 1). Tractor 60 is then manually tied by chains 48, 49 to frame 12 as hereinbefore described to ensure tractor 60 is stabilized on dolly 10 during the towing process. Thereafter, pneumatic lines 55, 56 are connected to ensure proper braking action by wheels 23, 23', 24, 24' of dolly 10. Next, electrical line 57 is attached to dolly 10 to operate brake lights 14 and warning array lights 13, also seen in FIG. 1. Hydraulic arm 51 can then be raised as is conventional to lift tractor 60 which likewise lifts dolly 10 affixed thereto from the ground as seen in FIG. 3 for towing purposes. Wrecker 50 then safely tows tractor 60 positioned on dolly 10 to a garage or other designated location. Once tractor 60 arrives, hydraulic arm 51 is lowered to lower tractor 60 and dolly 10 whereby pneumatic lines 55, 56 and electrical line 57 can be removed from wrecker 50, tie-down chains 48, 49 likewise removed and tractor 60 urged from dolly 10 by wrecker 50. Tractor 60 can then be disconnected from wrecker 50 as conventional for mechanical or other repairs. Once tractor 60 is removed, dolly 10 can then be reconnected as described above to wrecker 50 and towed to its original or other location.

The illustrations and examples provided herein are for explanatory purposes and are not intended to limit the scope of the appended claims.

I claim:

1. A dolly for use in safely supporting and towing a tractor in a forward direction without disconnecting the drive shaft of the tractor, the tractor having front and rear wheels, said dolly comprising: a frame, said frame defining a proximal end and a distal end, a ramp, said ramp affixed to said frame proximal end, a wheel, said wheel attached to said frame at the distal end, a warning light array, said warning light array extending the width of said frame, and positioned above said distal end of said frame, a planar bed, said planar bed attached to said frame to support the tractor rear wheels, said planar bed defining a space, a tie down bar, said tie down bar attached to said frame within said planar bed space, a pair of U-shaped clamps, each of said pair of clamps attached to said frame at the proximal end, each of said pair of clamps comprising a pivotal top, a stationary base, said pivotal top joined to said stationary base, a pair of pins, each of said pair of pins positionable through different ones of said pivotal tops to secure said pivotal tops in a closed posture to said stationary bases to secure each end of a wrecker towing arm whereby the tractor can be connected to a wrecker and rolled up said ramp at the proximal end of said frame for positioning on said frame for towing the tractor in a forward manner.

2. The dolly of claim 1 further comprising a stop, said stop attached to said frame between said proximal end and said distal end, said stop for limiting the movement of the tractor on said dolly.

3. The dolly of claim 1 further comprising an air tank, said air tank attached to said frame near the distal end.

* * * * *